SYMMETRICAL TYPE - FIRST MODE

ASYMMETRICAL TYPE - FIRST MODE

SYMMETRICAL TYPE - SECOND MODE

ASYMMETRICAL TYPE - SECOND MODE

SYMMETRICAL TYPE - THIRD MODE

ASYMMETRICAL TYPE - THIRD MODE

INVENTORS
FLOYD A. FIRESTONE
DANIEL S. LING, JR.
BY Joseph H. Lipschutz
ATTORNEY

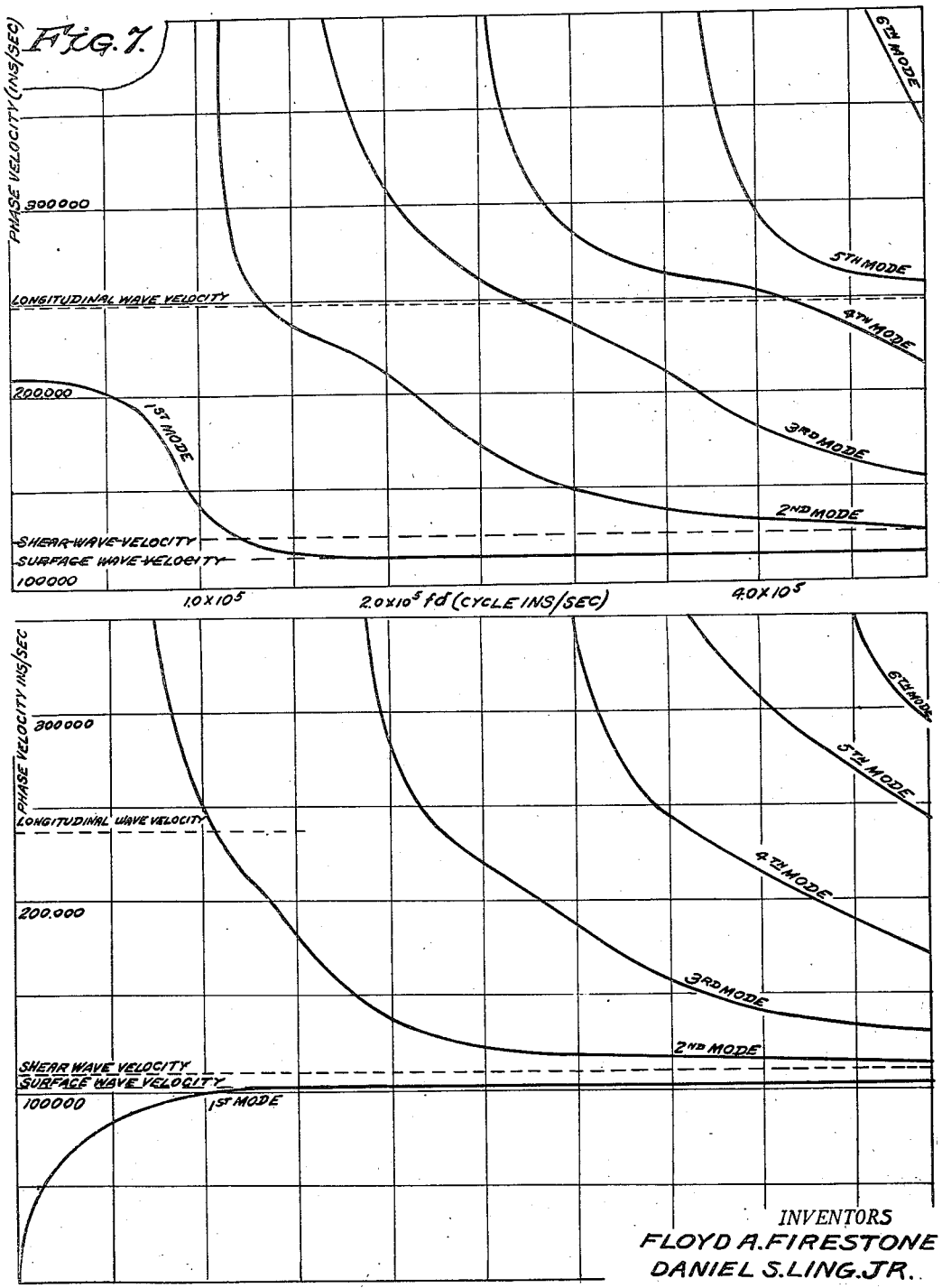

Jan. 2, 1951     F. A. FIRESTONE ET AL     2,536,128
METHOD AND MEANS FOR GENERATING AND UTILIZING
VIBRATIONAL WAVES IN PLATES

Filed May 21, 1946     5 Sheets-Sheet 3

INVENTORS
FLOYD A. FIRESTONE
DANIEL S. LING, JR
BY *Joseph H. Lipschutz*
ATTORNEY Jan. 2, 1951 F. A. FIRESTONE ET AL 2,536,128
METHOD AND MEANS FOR GENERATING AND UTILIZING
VIBRATIONAL WAVES IN PLATES
Filed May 21, 1946 5 Sheets-Sheet 4
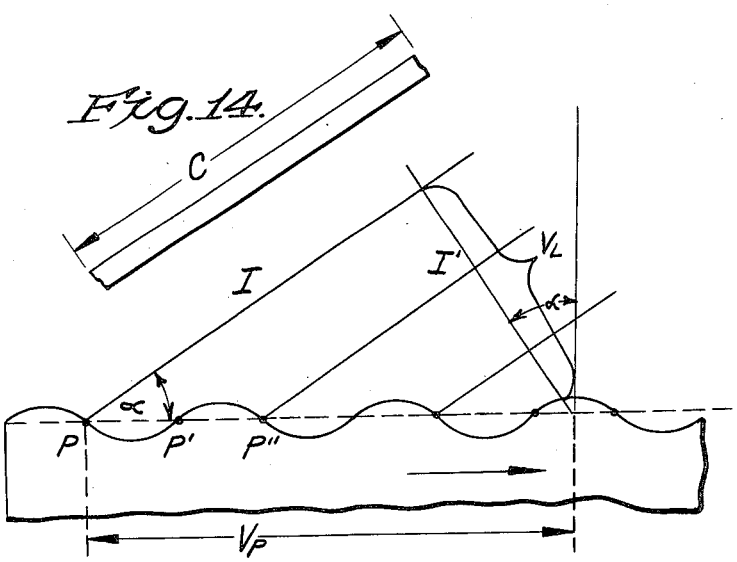
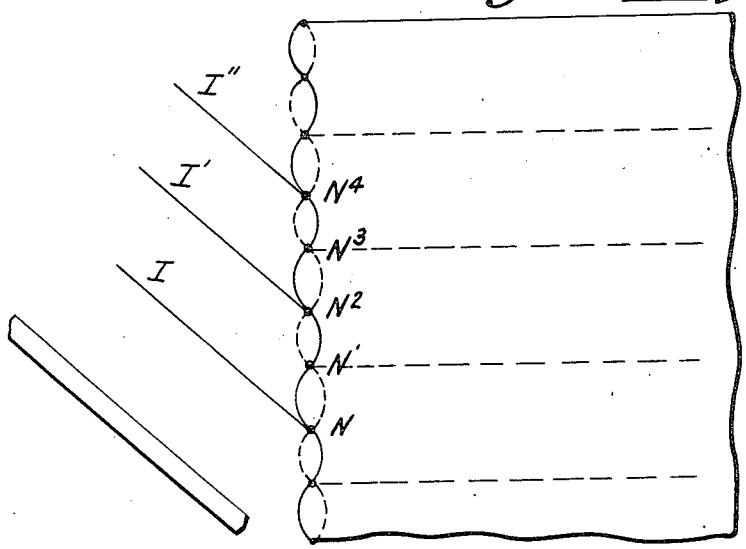
INVENTORS
FLOYD A. FIRESTONE
DANIEL S. LING, JR.
BY Joseph H. Lipschutz
ATTORNEY

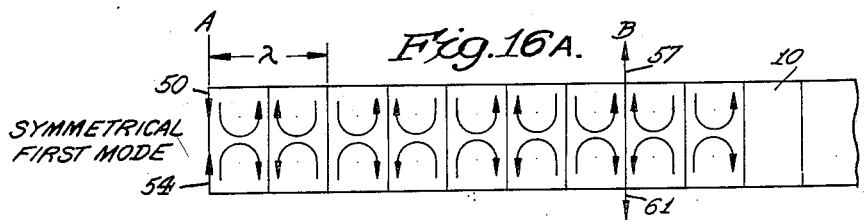
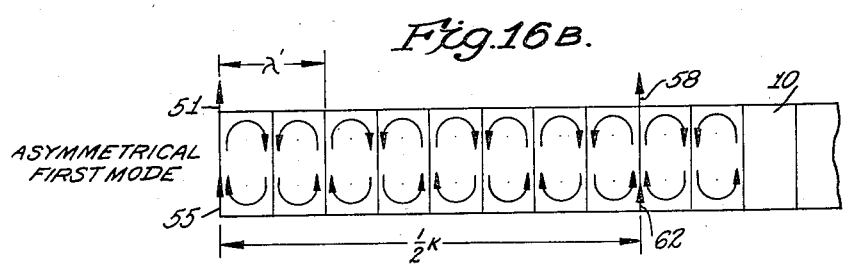
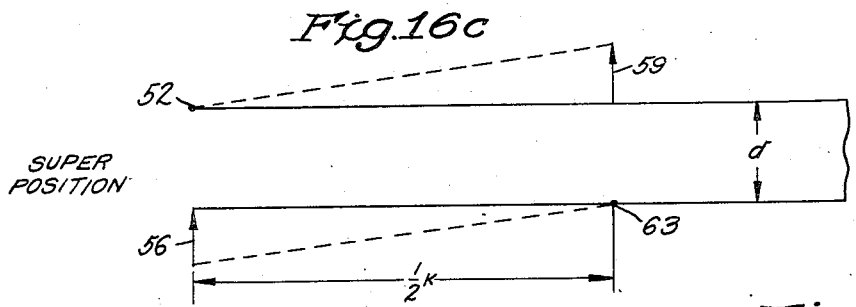
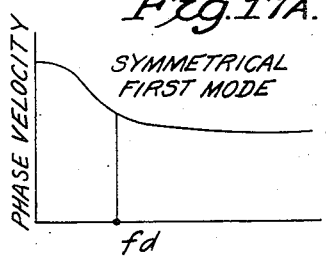
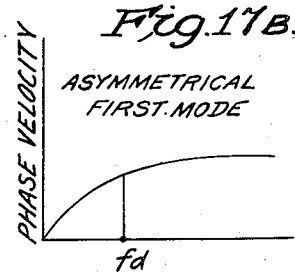
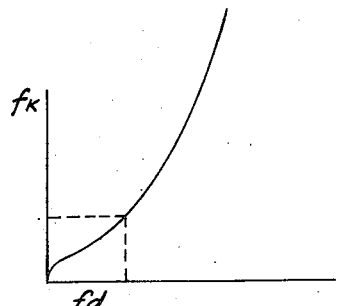
INVENTORS
FLOYD A. FIRESTONE
DANIEL S. LING, JR.
BY Joseph H. Lipschutz
ATTORNEY Patented Jan. 2, 1951

2,536,128

UNITED STATES PATENT OFFICE 2,536,128

METHOD AND MEANS FOR GENERATING AND UTILIZING VIBRATIONAL WAVES IN PLATES

Floyd A. Firestone, Washington, D. C., and Daniel S. Ling, Jr., Ann Arbor, Mich., assignors to Sperry Products, Inc., Hoboken, N. J., a corporation of New York Application May 21, 1946, Serial No. 671,348

11 Claims. (Cl. 73—67)

This invention relates to a method and means for generating and utilizing vibrational waves in plates. More specifically, the vibrational waves referred to are those which travel in the direction of the plane of the plate and extend through the plate. Such waves were discovered theoretically and their mathematical formulae worked out by Horace Lamb who published the results of his work in a paper entitled "On Waves in an Elastic Plate" printed in the "Proceedings of the Royal Society of London," Series A, volume XCIII, page 114. Lamb's consideration of this subject was entirely theoretical and there is no evidence that he actually produced these waves.

It is one of the principal objects of this invention, therefore, to provide a method and means for generating any of the types of Lamb waves described by him, some of which are also shown and described herein.

It is a further object of this invention to provide a novel method and means for utilizing the Lamb waves generated as herein described for the purpose of testing, measuring or otherwise investigating the properties of solid sheets or plates of material.

Further objects and advantages of this invention will become apparent in the following detailed description thereof.

In the accompanying drawings:

Fig. 7 is a graph showing wave phase velocity plotted against the product of frequency and plate thickness, for symmetrical types of Lamb waves.

Fig. 8 is a view similar to Fig. 7, for asymmetrical Lamb waves.

Fig. 14 is an elevation, largely diagrammatic, showing the method of applying the incident waves to a principal surface of a plate.

Fig. 15 is a view similar to Fig. 14 showing the method of applying the incident wave to an edge of a plate.

Figs. 16A, 16B and 16C are three related diagrammatic representations of symmetrical, asymmetrical and interfering symmetrical and asymmetrical waves in a plate.

Figs. 17A, 17B and 17C are graphs for the computation of plate thickness from interfering Lamb waves.

In Figs. 1 to 6 the arrows indicate the direction of propagation of the waves. The circular and elliptical figures represent the general directions of the displacements in the various regions within one wave length of a plate when passing the different types and modes of Lamb waves. In these figures the sets of intersecting solid lines parallel and perpendicular to the principal faces of the plates represented by the top and bottom lines of the figures, bound regions or cells within which the instantaneous displacements are in the general directions shown by the curved lines with arrows on them. On any of these horizontal lines, as shown, the displacement is at all times parallel to a principal face.

Figs. 1 to 6 and 16A and 16B show the displacements in sections of plates carrying Lamb waves, said sections being cut out by a plane at right angles to the principal face of the plates, said plane including the direction of propagation.

Figure 1:
Fig. 1 is a strain pattern of a plate subjected to Lamb waves of symmetrical type, first mode.
Figure 4:
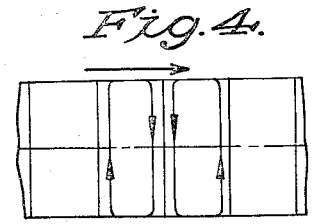
Fig. 4 is a view similar to Fig. 1, showing Lamb waves of asymmetrical type, first mode.
Figure 2:
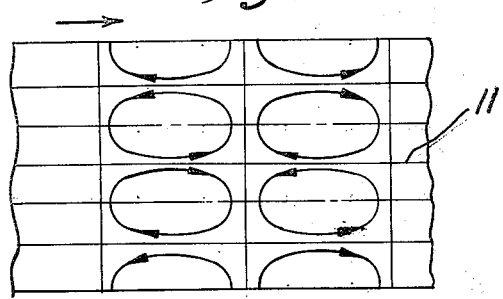
Fig. 2 is a view similar to Fig. 1, showing Lamb waves of symmetrical type, second mode.
Figure 5:
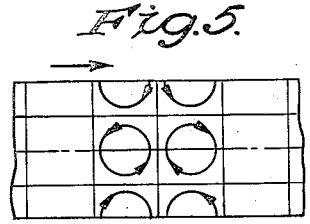
Fig. 5 is a view similar to Fig. 1, showing Lamb waves of asymmetrical type, second mode.
Figure 3:
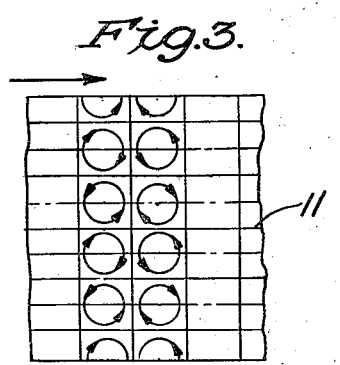
Fig. 3 is a view similar to Fig. 1, showing Lamb waves of symmetrical type, third mode.
Figure 6:
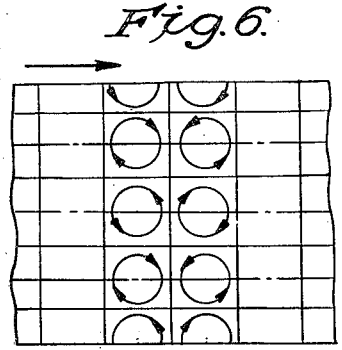
Fig. 6 is a view similar to Fig. 1, showing Lamb waves of asymmetrical type, third mode.

Lamb showed by his mathematical analysis that a plate is capable of transmitting an infinite number of kinds of waves, but he was able to classify these into two main types, namely symmetrical type and asymmetrical type. Each of these types is subdivided into first mode, second mode, third mode, etc. up to infinity. Lamb's classification of the kinds of waves which a plate can transmit is illustrated in Figs. 1 to 6. Figs. 1, 2, and 3 are symmetrical type but first, second, and third modes respectively. Figs. 4, 5, and 6 are asymmetrical type but first, second, and third modes respectively. Each of these figures shows the general nature of the displacements in the plates in a distance of one wavelength, when the various kinds of waves are traveling toward the right. The higher the mode number, the greater the number of cells into which the displacement pattern breaks up. This displacement pattern runs along the plate with a velocity known as the "phase velocity" which is defined as the velocity of propagation of a given phase of disturbance, say a crest, when an infinitely long train of sinusoidal waves is transmitted. This is in distinction to the "group velocity" which is the velocity with which a short train of waves is propagated, which in a plate is in general different from the phase velocity.

Referring again to Fig. 1 for symmetrical type, first mode, if the frequency of the waves were reduced say to one half its previous value, the wave length would become longer, in fact more than twice as long, since Lamb's computations show that as the frequency of this kind of wave is reduced, the phase velocity increases. This is shown in the lower curve of Fig. 7 where the abscissa is proportional to frequency and the ordinate is phase velocity in inches per second for an aluminum plate. For other materials curves similar to Figs. 7 and 8 would have to be computed using Lamb's equations. Thus, at very low frequencies this kind of wave becomes a compressional wave in a thin plate with a velocity of 206,000"/sec., but at very high frequencies it travels with standard surface wave velocity of 110,000"/sec.

Passing now to Fig. 2 and the symmetrical type, second mode the phase velocity again depends on the frequency as shown in Fig. 7 by the curve labelled "2nd mode." As the frequency is lowered the phase velocity approaches infinity, and below a certain frequency this kind of wave is not possible in a plate of given thickness. Fig. 7 also shows phase velocities for the third and higher modes of symmetrical type.

Fig. 4 shows the displacements in the asymmetrical type, first mode which travels with a phase velocity shown in the lowest curve of Fig. 8. This kind of wave has a lower phase velocity as the frequency is lowered, so if the frequency is cut in half, the wavelength will become longer, but not twice as long, plate thickness being kept constant. Fig. 8 also shows the phase velocities of the asymmetrical type, second and third modes whose displacement patterns are shown in Figs. 5 and 6.

It will be seen from Figs. 1 to 3 that in waves of the symmetrical type of any mode, the displacements in the lower half of a plate are the image of those in the upper half, mirrored in the median plane of the plate. Figs. 4 to 6 show that in waves of the asymmetrical type of any mode, the displacements in the right portion of a plate are the image of those in the left portion, mirrored in a properly chosen plane perpendicular to the principal faces of the plate.

Referring again to Figs. 7 and 8 we notice that while at low products of frequency times plate thickness ($fd$) only the first modes of either type can be propagated, at higher products of ($fd$) any type or mode can be propagated by the plate. Our invention provides a means for exciting at will any desired type and mode which the plate is capable of transmitting at the chosen frequency.

As stated in the introduction hereto, while Lamb discovered these strain patterns mathematically, he disclosed no way by which any desired mode could be generated or received. The method here disclosed consists in causing a wave of predetermined velocity and frequency to pass through a fluid medium and strike a surface of a plate at a given angle of incidence, whereby any desired type and mode of Lamb wave can be generated in the plate in accordance with the formula $$\sin \alpha = V_L/V_P$$

Where $V_P$ is the phase velocity of the desired Lamb wave, $V_L$ is the velocity of propagation of the incident wave, and $\alpha$ is the angle of incidence. Thus $V_L/\sin \alpha$ is the velocity with which the line of intersection of a wave front in the liquid and the plate surface runs along the plate surface. If $\alpha$ is so adjusted as to cause $V_L/\sin \alpha$ to equal the phase velocity of the desired type and mode of wave in the plate, as shown in Figs. 7 and 8 at the chosen value of $fd$, then that type and mode will be generated in the plate. Thus, if it is desired to generate a first mode symmetrical type Lamb wave, with a $fd$ factor of $1.0 \times 10^5$, $V_P$ is 140,000"/sec. (see Fig. 7), and if the liquid is water, $V_L = 57,000$"/sec. The only unknown factor is $\alpha$ which is then found to be 24.5°. Other kinds of waves may be generated by varying the angle of incidence. For example, if first mode, asymmetrical type with a $V_P$ of 105,000"/sec. is to be generated, the angle of incidence should be made 33°, while for a second mode, asymmetrical type where $V_P$ is 256,000"/sec., the angle of incidence should be made 12.2°.

As a further example, if the frequency is so chosen that $fd = 2.0 \times 10^5$, reference to Figs. 7 and 8 will show that any one of the following kinds of waves could be radiated, depending upon what value of $\alpha$ is chosen:

| Type | Mode | Phase Vel. | $\alpha$ |
| --- | --- | --- | --- |
| | | | Degrees |
| Asymmetrical | 1st | 105,000"/sec | 33 |
| Symmetrical | 1st | 110,000"/sec | 31 |
| Asymmetrical | 2nd | 135,000"/sec | 25 |
| Symmetrical | 2nd | 210,000"/sec | 16 |
| Do | 3rd | 310,000"/sec | 10.6 |
| Asymmetrical | 3rd | 335,000"/sec | 9.8 |

Thus, having chosen the frequency $f$, and having a given thickness of plate $d$, the choice of the angle $\alpha$ determines the kind of wave which will be radiated along the plate. When the angles $\alpha$ for the radiation of two kinds of waves are nearly equal, then it is necessary, if only one of these is to be radiated to the exclusion of the other, that the incident beam of waves in the liquid should be of large cross-section in the dimension in which the waves are to be radiated along the plate. By cutting down on this dimension, two or more kinds of waves may be radiated simultaneously, if desired.

As shown in Fig. 14, if the dimension C of the energizing crystal is small so that only two or three waves as shown are in simultaneous engagement with the upper principal face of the plate, the angle of incidence could be varied considerably before the wave shown at the right would shift very much in phase relative to the crest of the wave which it is trying to produce in the plate, and consequently several types or modes of Lamb waves might be simultaneously produced; but if the cross-section of the incident beam is sufficient to give simultaneous intersection of 100 waves, a very slight change of angle $\alpha$ would cause destructive interference and only one type and mode would be radiated at a given angle of incidence.

For transmitting the incident wave into engagement with a surface of the plate there may be employed a transducer which may comprise a housing 20 closed except for one surface which is in engagement with the plate. The housing is filled with a fluid in which there is positioned a piezo-electric crystal 30 pivotally mounted for movement about a transverse axis 31 whereby the angle of incidence of waves generated when the crystal is energized can be adjusted with respect to the surface 21 against which the waves strike. Any suitable mechanism may be employed for varying the angle of the crystal.

Figure 9:
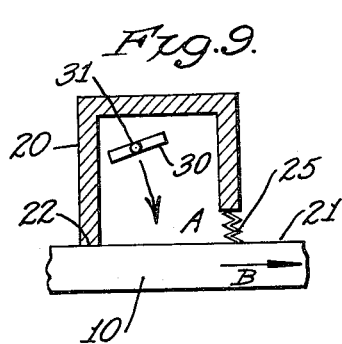
Fig. 9 is a vertical section through a transducer showing means for generating or receiving Lamb waves in a plate without substantial damping of the waves.
Figure 10:
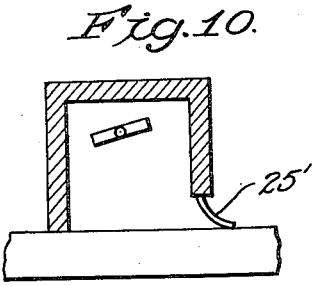
Fig. 10 is a view similar to Fig. 9, showing a modified form.
Figure 11:
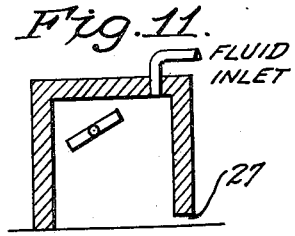
Fig. 11 is a view similar to Fig. 9, showing another modified form.

The waves, in the fluid, indicated by arrow A, on striking the surface 21 set up waves in the plate which are propagated through the plate in the direction of the arrow B. It is a characteristic of these waves that they are easily damped, for instance, by holding a rigid member in engagement with the surface 21. The contacting edge 22 of the housing is such a rigid member and in order to prevent such damping the portion of the housing in the path of the waves in the plate is made non-rigid to offer an undamped escape port. Thus the portion 25 may be a rubber strip as shown in Figs. 9 and 10. In the latter figure the strip is tapered outwardly in the direction of propagation of the waves in order that there shall not be an abrupt termination of the fluid in the escape port. In the Fig. 11 form, the bounding surface of the housing in the path of the waves is removed entirely, and a small gap is thus formed through which the fluid will pass continuously while sufficient fluid is fed continuously into the housing to maintain the crystal submerged at all times.

Figure 12:
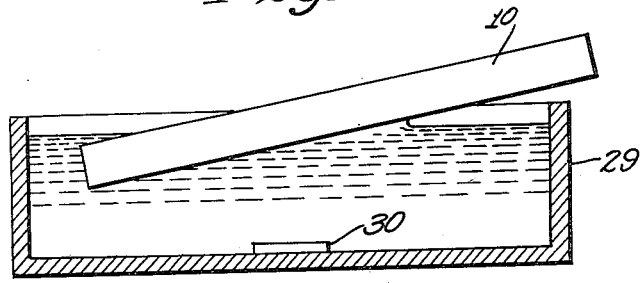
Fig. 12 is an elevation showing another method of generating Lamb waves in a plate.

In Fig. 12 there is disclosed another method of generating any desired type and mode of Lamb waves in a plate utilizing the same fundamental principle of causing the exciting wave to strike the plate at the calculated angle necessary to generate the desired wave. In this form the crystal is fixed in position within a container filled with a fluid and the plate is held at the proper angle to provide the desired angle of incidence.

The wave fronts in the fluid, emanating from the crystal, and spaced one wave length apart, will intercept the plate at spaced points, as shown, for example, in Fig. 14. For maximum efficiency, the distance between intercepts should bear a definite relation to the type of wave being generated. In Fig. 14 there is illustrated the surface of a plate when transmitting a given type and mode of Lamb wave, the instantaneous displacement of the surface lines being greatly exaggerated. For maximum efficiency of radiation into the plate, the wave fronts in the fluid one wavelength apart, such as I, I' should strike the plate at lines on the surface of the plate separated by one wave length of the wave motion in the plate, for example, at points P and P''. The lateral dimension C of the crystal should be sufficiently great to produce a beam of waves in the fluid, which will in turn produce a considerable number of simultaneous intercepts one wave length apart in order that only one type and mode will be radiated at one time. If it is desired to radiate more than one type and mode of Lamb wave simultaneously, this can be achieved by making the lateral dimension C small.

Figure 13:
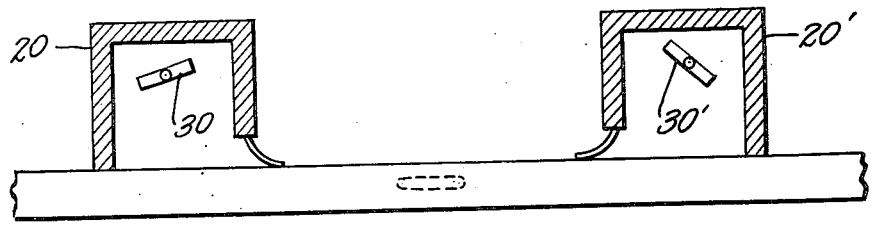
Fig. 13 is a vertical section, largely diagrammatic, showing a method and means for utilizing Lamb waves for the inspection of a plate.

The same principle of obtaining maximum efficiency applies also when the incident wave is applied to an end of the plate. At an end of a plate into which Lamb waves are being radiated, the displacements normal to the surface are of the nature of a standing wave, as shown in Fig. 15, where N, $N^1$, $N^2$, $N^3$, etc. are nodal lines. On a principal face, as shown in Fig. 14, the situation is different to the extent that the displacement pattern shown is a progressive wave, and the points P, P' and P'' move along the principal face with the phase velocity of propagation. Here the wave fronts in the fluid are applied to the end of the plate at such an angle of incidence that the intercepts of wave fronts in the fluid one wave length apart, such as I, I' and I'', have a spacing equal to the distance between alternate nodal lines, such as N, $N^2$, $N^4$ in the type and mode desired to be radiated. The arrow indicates the direction of propagation. On each nodal line the component of instantaneous displacement perpendicular to the end surface is zero. Even though the Lamb waves are generated by longitudinal waves impinging on the end of the plate, they may be used for measuring the plate thickness or for finding flaws in the plate by reflection or finding flaws in the plate by change of type or mode of Lamb wave as shown in Fig. 13.

As described hereinbefore, if the exciting wave is caused to strike the plate at a predetermined angle of incidence, and with a frequency such that the product of the frequency and the plate thickness $(fd)$ is a predetermined value, a given type and mode of wave will be produced in the plate. If another transducer is set up along the plate (see Fig. 13) with a housing 20' and crystal 30' set at an angle of exit equal to the angle of incidence of the exciting wave, the generated type and mode will be received at crystal 30', and a voltage will be generated thereby, the process being exactly the reverse explained above for the radiation of waves. Thus the same transducer may serve either as sender or receiver. There is utilized the fact that a given type and mode of wave on striking a fissure or other defect within the plate will generate other modes or types of waves than the incident wave. The absence of material at the fissure causes utilization of the force which would have been utilized had this material been present. The fissure becomes a localized source of oscillating force which will generate several different modes, as well as influence the mode which struck it initially. By setting the receiving crystal 30' at an angle different from the angle of sending crystal 30 so as to receive modes different from the mode transmitted by crystal 30, fissures can be detected. This is due to the fact that crystal 30' will not receive any appreciable wave energy when no fissure is present (since it is not set at the angle necessary to receive the mode transmitted by crystal 30), but will receive substantial wave energy when a fissure is present (such energy being the mode or modes generated at the fissure).

Still another method of utilizing the hereinbefore described Lamb waves is illustrated in Figs. 16 and 17. In this embodiment of the invention there is utilized the principle that the difference in phase velocities of different types and modes of Lamb waves will result in points of interference, and, hence, points of maximum and minimum vibrations of the plate. Furthermore, for any two given interfering types and modes of waves, these points of maximum and minimum vibration will occur at constant, periodic intervals.

Thus, for example, referring to Figs. 16A, 16B and 16C there is illustrated diagrammatically the theory of this embodiment of the invention. Fig. 16A is a strain pattern showing graphically the direction of displacement in the plate 10 in response to a first mode, symmetrical type Lamb wave. Fig. 16B is a similar strain pattern in plate 10 of a first mode, asymmetrical type Lamb wave. Since the asymmetrical wave has a lower velocity and shorter wave length than the symmetrical type, there will be points at predetermined constant distances apart where these interfering waves will result in maximum and minimum strain if both waves are generated simultaneously in plate 10. Thus, for example, at the starting position A it will be seen that the direction of strain on the upper surface of the plate as shown by the arrow 50 is downwardly in response to the symmetrical wave and is upwardly, as shown by arrow 51, in response to the asymmetrical wave, thus resulting in a point 52 of minimum strain which is the composite of the opposite strains 50 and 51. In position A on the lower surface of plate 10 the direction of strain is upward, as shown by arrow 54, in response to the symmetrical wave and is upward, as shown by arrow 55, in response to the asymmetrical wave, so that the composite of both waves results in maximum upward strain, as shown by arrow 56, which is the composite of the two upward strains 54 and 55. Since the wave length λ of the symmetrical wave is longer than the wave length λ' of the asymmetrical wave, the symmetrical wave will gradually gain on the asymmetrical wave until in position B it has gained ½ of an asymmetrical wave length. In this position the strain on the upper surface, as shown by arrow 57, in response to the symmetrical wave is upward and the strain in response to the asymmetrical wave, as shown by arrow 58, is also upward resulting in a point of maximum upward strain, as indicated by arrow 59, when the two waves are superimposed. On the other hand, on the lower surface of the plate, in position B, the strain is downward in response to the symmetrical wave, as shown by arrow 61, but is upward in response to the asymmetrical wave, as shown by arrow 62, thus resulting in a point 63 of minimum strain when the two waves are superimposed.

Thus between positions A and B the symmetrical wave has gained ½ of an asymmetrical wave length. The distance between successive points of minimum vibration on each surface may be denoted by the letter $k$ and this distance $k$ can be determined in any of several ways. Assume that the two interfering waves have been generated in the plate and a suitable receiver for detecting the superposition of these waves at a distant point is employed. The operator then places his finger on the surface of the plate on the line between sender and receiver, which will most generally almost completely damp out the received waves. The operator does not feel the waves in his finger. But if the finger is placed on those particular spots such as 52 or 63 in Fig. 16C where interference has produced a minimum of strain, the waves received by the receiver will continue strong. Thus, the distance $k$ between points of minimum strain due to interference can be determined. As will be demonstrated later, when the distance $k$ is known, the thickness of the plate can be determined because the spacing $k$ depends on the thickness of the plate for an assigned frequency.

The beam of two waves can be sent across a plate and a reflection obtained from the other side so that the position of no damping can be observed at the sending station. As an alternative, the waves can be sent out from one transmitter and received by a suitable receiver such as a crystal and the points of no damping by the finger observed on the receiver. Still another method consists in using the receiving crystal itself for the purpose of detecting the points of minimum pickup by moving the receiver, which may be a crystal, along the plate.

When the distance $k$ is determined by any of the above methods, the thickness of the plate can be determined in the following manner:

(1) $$\lambda_S = \frac{V_S}{f} \quad \text{and} \quad \lambda_A = \frac{V_A}{f}$$

where $\lambda$ is wave length, S refers to symmetrical wave, A refers to asymmetrical wave and V is phase velocity.

(2) Number of A wave lengths in distance $k$, $$N_A = \frac{k}{\lambda_A} = \frac{fk}{V_A}$$

(3) Number of S wave lengths in distance $k$ is one less, $$N_S = \frac{k}{\lambda_S} = \frac{fk}{V_S} = N_A - 1 = \frac{fk}{V_A} - 1$$

(4) $$\frac{fk}{V_S} = \frac{fk-1}{V_A} = \frac{fk - V_A}{V_A}$$

(5) $$fkV_A = fkV_S - V_A V_S$$

(6) $$fk(V_S - V_A) = V_A V_S$$

(7) $$fk = \frac{V_A V_S}{V_S - V_A}$$

From Figs. 7 and 8 which give the curves for symmetrical type, first mode and asymmetrical type, first mode, plotting phase velocity against $fd$, there can be computed the values of $fk$ as a function of $fd$ for any given values of $V_S$ and $V_A$. A graph such as Fig. 17C can thus be devised by computation for various values of $fk$ versus $fd$. Thus when $fk$ is known, $fd$ can be found, and if $f$ is kept constant, $d$ can be plotted directly against $k$.

While this specification has been devoted principally to the description of methods or means for producing Lamb waves in plates, the principle of reciprocity indicates that these same means can be used for the detection of Lamb waves traveling along the plate and being incident upon these means.

Having described our invention, what we claim and desire to secure by Letters Patent is:

1. The method of inducing Lamb waves in a plate, which consists in transmitting waves of a predetermined velocity into engagement with a principal face of the plate at a predetermined angle of incidence substantially in accordance with the formula:

$$\sin a = V_L / V_P$$

in which $V_P$ is the phase velocity of the desired Lamb wave, $V_L$ is the velocity of the incident wave, and $a$ is the angle of incidence measured from the normal.

2. The method of inducing Lamb waves in a plate, which consists in transmitting waves of a predetermined phase velocity through a liquid into engagement with a principal face of the plate at a predetermined angle of incidence substantially in accordance with the formula:

$$\sin a = V_L / V_P$$

in which $V_P$ is the phase velocity of the desired Lamb wave, $V_L$ is the velocity of the incident wave, and $a$ is the angle of incidence.

3. A device for transmitting waves into engagement with the surface of a plate for inducing Lamb waves therein, comprising a casing containing liquid and having one end in engagement with said surface, means in said casing for transmitting a wave through the liquid at a predetermined angle of incidence to said surface to induce a Lamb wave in said plate from the region of said casing outwardly beyond said casing, the end of said casing in engagement with said surface having means for preventing damping of the induced Lamb waves in the plate, said means comprising a wave escape port.

4. A device for transmitting waves into engagement with the surface of a plate for inducing Lamb waves therein, comprising a casing containing liquid and having one end in engagement with said surface, means in said casing for transmitting a wave through the liquid at a predetermined angle of incidence to said surface to induce a Lamb wave in said plate from the region of said casing outwardly beyond said casing, the end of said casing in engagement with said surface having means for preventing damping of the induced Lamb waves in the plate, said means comprising a wave escape port of substantially non-damping material.

5. A device for transmitting waves into engagement with the surface of a plate for inducing Lamb waves therein, comprising a casing containing liquid and having one end in engagement with said surface, means in said casing for transmitting a wave through the liquid at a predetermined angle of incidence to said surface to induce a Lamb wave in said plate from the region of said casing outwardly beyond said casing, the end of said casing in engagement with said surface having means for preventing damping of the induced Lamb waves in the plate, said means comprising a wave escape port of material having substantially the flexibility and non-damping properties of rubber.

6. A method of testing plates for defects, comprising transmitting a wave of predetermined velocity into engagement with a surface of the plate at a predetermined angle of incidence whereby a Lamb wave of given type and mode will be induced, and receiving Lamb waves from said plate at a position spaced from the position of incidence and at an angle of exit different from the angle of incidence.

7. A method of testing plates for defects, comprising transmitting a wave of predetermined velocity into engagement with a surface of the plate at a predetermined angle of incidence whereby a Lamb wave of given type and mode will be induced, and receiving Lamb waves from said plate at a position spaced from the position of incidence and at an angle of exit different from the angle of incidence of said induced Lamb wave and corresponding to the angle of incidence required to induce a Lamb wave of different type or mode.

8. A transducer for Lamb waves in a plate comprising a limited body of fluid in engagement with a surface of the plate, a directional transducer of longitudinal waves in the fluid and means for positioning said transducer with its effective direction at a predetermined angle corresponding to a desired type and mode, said angle being substantially in accordance with the formula:

$$\sin \alpha = V_L/V_P$$

where $V_P$ is the phase velocity of the desired Lamb wave, $V_L$ is the velocity of the wave in the fluid, and $\alpha$ is said predetermined angle.

9. The method of determining the thickness of a plate, which consists in generating in the same portion of the plate two types or modes of Lamb waves simultaneously and determining on a surface of the plate the distance between points of minimum vibrational amplitude as an index of the plate thickness.

10. The method of inducing Lamb waves of desired type, mode, and frequency in a plate, comprising the steps of: determining the wave length of Lamb waves of the desired type, mode, and frequency; striking a surface of the plate with longitudinal waves of the desired frequency; and setting the angle of incidence of said longitudinal waves so as to make the distance between adjacent intercepts of said longitudinal waves with said plate surface substantially equal to the wave length of said Lamb wave.

11. The method of inducing Lamb waves of desired type, mode, and frequency in a plate, comprising the steps of: determining the distance between alternate nodal planes in the plate for Lamb waves of the desired type, mode, and frequency; striking an end surface of the plate with longitudinal waves of the desired frequency; and setting the angle of incidence of said longitudinal waves so as to make the distance between adjacent intercepts of said longitudinal waves with said plate and surface substantially equal to said distance between nodal planes.

FLOYD A. FIRESTONE.
DANIEL S. LING, JR.

REFERENCES CITED

The following references are of record in the file of this patent:

UNITED STATES PATENTS

| Number | Name | Date |
|---|---|---|
| 2,280,226 | Firestone | Apr. 21, 1942 |
| 2,394,461 | Mason | Feb. 5, 1946 |
| 2,439,130 | Firestone | Apr. 6, 1948 |
| 2,463,328 | Sproule | Mar. 1, 1949 |

FOREIGN PATENTS

| Number | Country | Date |
|---|---|---|
| 70,301 | Norway | Apr. 23, 1946 |